Oct. 18, 1932.　　　　S. A. STRICKLAND　　　　1,883,079
PUNCH AND DIE FOR ROLLER BEARING CAGES
Filed Oct. 11, 1930　　　2 Sheets-Sheet 1
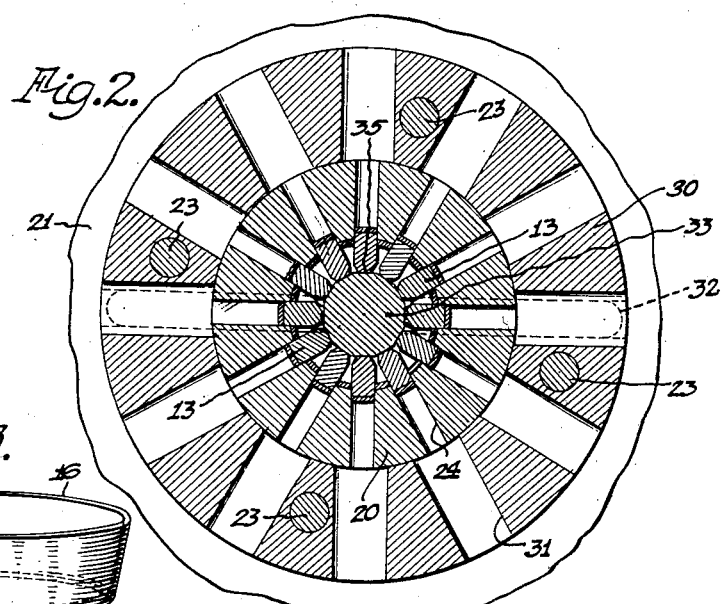
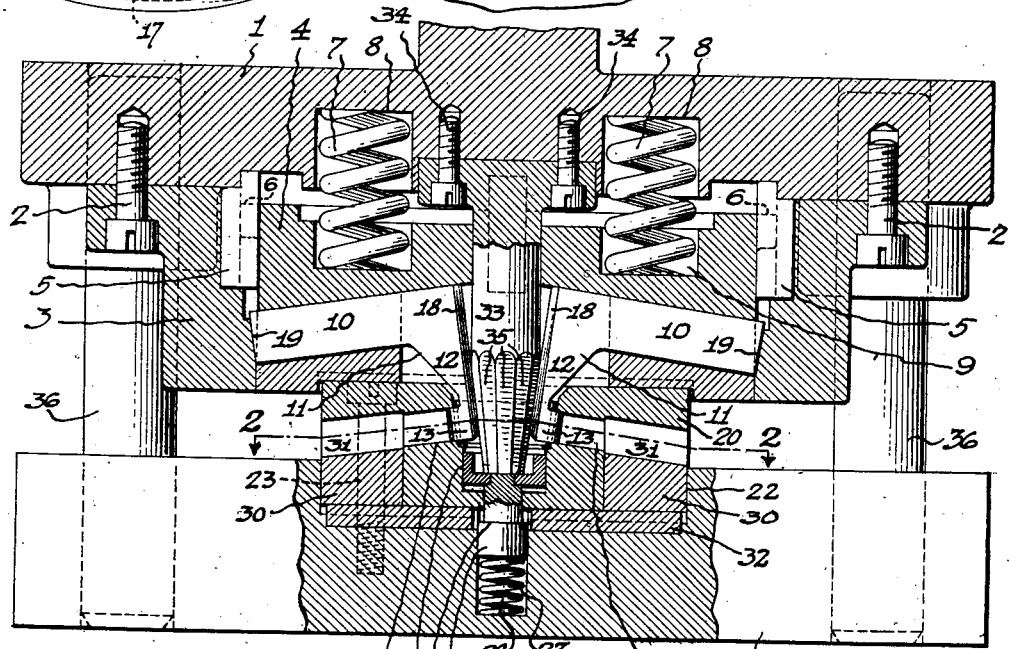
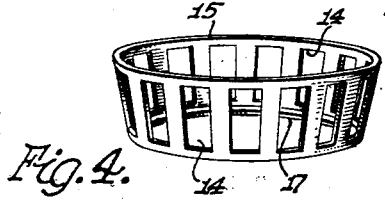
INVENTOR
Silas A. Strickland,
BY
ATTORNEYS Oct. 18, 1932.  S. A. STRICKLAND  1,883,079
PUNCH AND DIE FOR ROLLER BEARING CAGES
Filed Oct. 11, 1930    2 Sheets-Sheet 2

INVENTOR
Silas A. Strickland,
BY
ATTORNEYS

Patented Oct. 18, 1932

1,883,079

UNITED STATES PATENT OFFICE

SILAS A. STRICKLAND, OF DETROIT, MICHIGAN, ASSIGNOR TO BOWER ROLLER BEARING CO., OF DETROIT, MICHIGAN, A CORPORATION OF MICHIGAN

PUNCH AND DIE FOR ROLLER BEARING CAGES

Application filed October 11, 1930. Serial No. 487,997.

This invention relates to a device especially adapted for use in connection with a press for forming a plurality of openings in roller bearing cages and similar annular articles, and an object of the invention is to provide a machine or device for forming such openings in one operation and which device is simple in construction, very accurate in operation, and in which wear of the parts is reduced to the minimum.

With the above and other ends in view, the invention consists in part in providing a series of slidable punches and means for simultaneously moving all of these punches radially outward to perforate the annular member, and in providing a movable carrier for these punches which is accurately guided in its movements and through such movements accurately locates said punches and positively moves the same to retracted position. The invention further consists in an arrangement of slidable punches, whereby such punches are arranged to be entered within an annular member of comparatively small diameter and then moved bodily, radially of said member to form openings therein of the desired size and shape, and the invention also consists in the construction, arrangement and combination of parts, all as hereinafter more fully set forth and particularly pointed out in the appended claims, reference being had to the accompanying drawings in which—

Figure 1 is a transverse vertical section through a device embodying the invention, with parts shown partly in elevation;

Fig. 2 is a section substantially upon the line 2—2 of Fig. 1;

Fig. 3 is a perspective view of a roller bearing cage blank to be perforated;

Fig. 4 is a like view of a finished cage;

Figure 5:
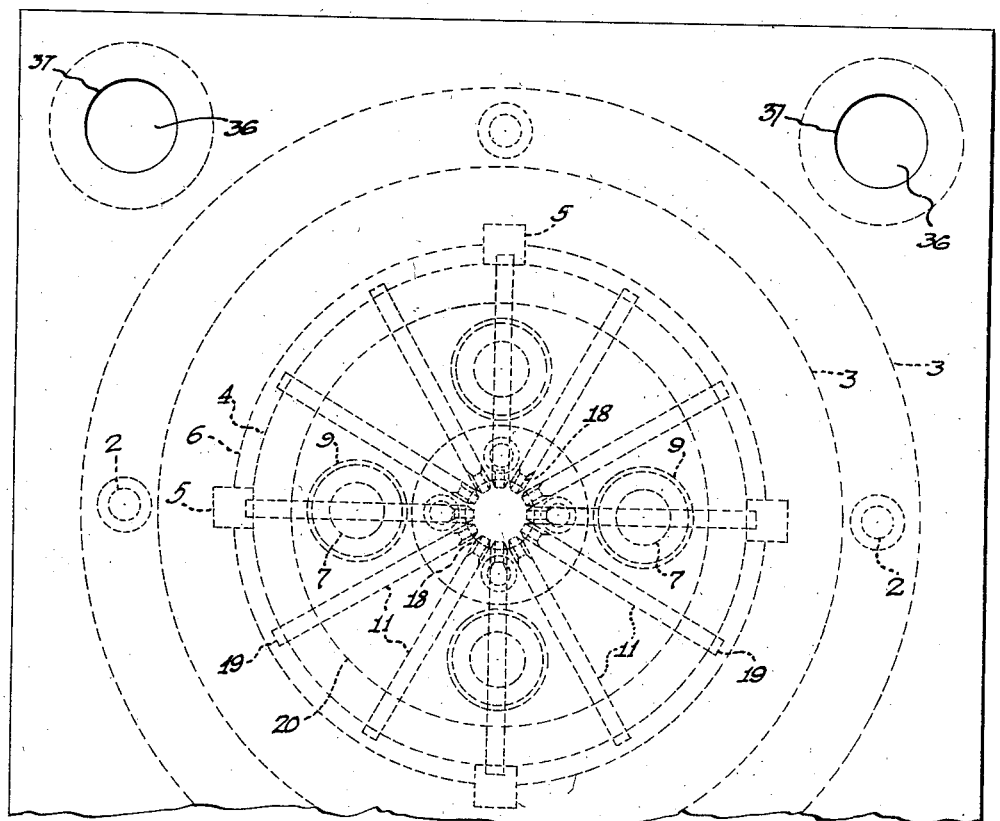
Fig. 5 is an inverted plan view of the device showing the relative position of punches and other parts above, in dotted lines.

This device is adapted to be used with and operated by a suitable press to the vertically movable member or ram of which press, the head 1 of this device is secured in any suitable manner, or this head may be a part of the press ram. Secured to the lower face of this head by bolts 2 or otherwise, is a guide ring 3 within which is positioned a circular carrier block 4 fitting within the ring to slide vertically therein and be accurately guided on the head thereby, the carrier block being held against rotation within the guide ring relative to the head, by means of keys 5 set into openings in the ring and held therein by the bolting of the ring to the head, these keys projecting laterally into notches in a flange 6 which projects laterally from the carrier block 4 at its upper end.

Coiled springs 7 are interposed between the head 1 and carrier block 4 to exert a force tending to move the block downwardly in its guide ring relative to the head, the end portions of said springs being set within bores 8 in the lower side of the head, and like bores or sockets 9 in the upper side of the carrier block so that these springs are enclosed and held in place to freely expand and contract upon relative movement of block and head.

The carrier block may be split for convenience in forming therein, radial guide ways for the laterally extending arms 10 which are rectangular in cross section, said arms being an integral part of punches indicated as a whole by the numeral 11, and which punches each comprise such an arm formed at its inner end with a downwardly extending leg 12 having at its lower end an outwardly extending foot portion 13 of proper size and shape to punch the desired openings 14 in the roller bearing cage 15 shown in Fig. 4, said cage being formed from the annular tapering blank 16 shown in Fig. 3, which blank is provided at its smaller end with an inwardly extending flange forming the flange 17 of the finished cage. The inner end surface 18 of each punch 11 extends the full length of the leg 12 to the upper edge of the arm 10 and the radial guide ways for these punches are so formed in the carrier block 4 that these end faces or edges 18 of the several punches extend in an outwardly and upwardly inclined position corresponding to the inclination of the conical wall of the blank 16, and the arms 10 of the several punches all extend radially outward and downward so that the punches in sliding radially inward and outward in these guide ways will move at right angles to said wall and their forming feet 13 will come squarely into contact with said wall when moved radially to punch the openings 14 therein.

The outer end surfaces 19 of the several punch arms 10 are formed at right angles to the side guide edges of these arms and therefore, due to this inclined setting of the punches in the block, the upper corner at the outer end of each arm will project beyond the circular side wall of the block when the punches are at the limit of their outer radial movement, they being of such a length that the lower corners of said outer ends of said arms will be just even with such wall surface when the punches are at the limit of their outward movement. The inner surface of the guide ring 3 is notched to receive the projecting upper corners of the punch arms when the carrier block is fully up within the ring 3 as shown in Fig. 1, and this surface 19 of each punch therefore serves as a cam to force the punches radially inward when the ring 3 and carrier block 4 are moved relatively, the inner surface of the ring contacting the ends of said arms and forcing the punches inwardly to withdraw their punch ends 13 from the openings 14 in the cage wall after punching these openings.

To support the blank 16 while the punches are operating to punch the holes therein, a die block 20 having an axial opening in its upper end of just sufficient size and shape to receive the blank, is provided, and this die block is secured to a base plate 21 by recessing the base as at 22 to receive the block and firmly securing the block in this recess by means of screw bolts 23. This die block is recessed axially at the bottom of the cup or socket forming the die proper, within which the blank fits and is also formed with radial openings 24 to receive the punchings severed from the wall of the blank when the punches are forced outwardly, the inner ends of these openings forming the die openings determining the shape and size of the openings 14 in the cage, and within the recess at the bottom of the die cup, is a hardened cup 25 secured upon the upper end of a stem 26 guided within a bore 27 in the base 21, and within this bore between its lower end and the lower end of the stem, is a spring 28, the expansive force of which tends to hold the cup projected upwardly into the bottom of the die recess, proper, it being limited in such movement by a collar 29 on the lower end of the stem coming into contact with the bottom of the die block. For the purpose of facilitating the machining of the die block, it may, as shown, be provided with a ring 30 fitting over a reduced lower end portion of the block and formed with radial openings 31 forming continuations of the openings 24, providing passages for the lateral escape of the punchings, these openings or passages 24 and 31 being inclined outwardly and downwardly to facilitate such escape.

To prevent rotation of the die block within its recess in the base 21 and hold said block in proper position relative to the several punches 11, keys 32 are set in the bottom of the recess in the base 21, in which recess the die block is set, and these keys fit within a transverse groove in the bottom end of the die block.

To move the several punches radially outward in their guideways in the carrier block 4 after said block has been moved downward and seated upon the die block 20, a spreader 33 in the form of a round stud or shaft is connected to the head 1 at the axis thereof and extends downwardly therefrom to engage within an axial opening in the carrier block, said spreader being rigidly secured to the head by screws 34 as shown in Fig. 1, or connected thereto in any suitable manner to be moved thereby, the lower end of said spreader being tapered to correspond with the inclination of the end faces 18 of the several punches, and formed with facets 35 corresponding in number to the number of punches to contact the end faces 18 thereof and force the punches radially outward when the spreader is forced downwardly between them. An extended contact area of spreader with punches is thus provided and all punches are moved positively and evenly outward, the high force required to drive the hole forming ends 13 through the wall of the blank, being applied directly to these ends, giving extreme accuracy.

The head 1 is accurately guided in its movement toward and from the base 21 by means of four guide posts 36 set at their lower ends in the base and engaged at their upper ends in holes 37 in the head to slide therein as the head is moved relative to the base, but accurately locating the carrier block guided thereon by the ring 3, relative to the die block 20, and thus accurately locating the punches so that their lower ends will enter the blank 16 positioned in the die.

Figure 6:
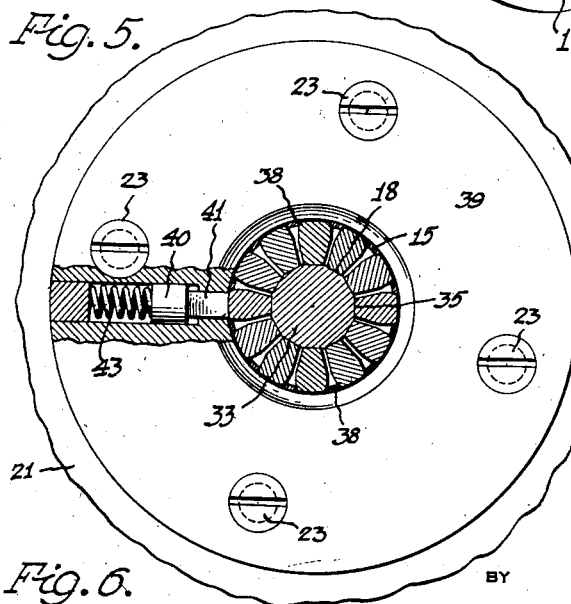
Fig. 6 is a plan view of a die block showing a member for positioning the work, and showing the hole forming end portions of punches in section and of a slightly modified configuration.
Figure 7:
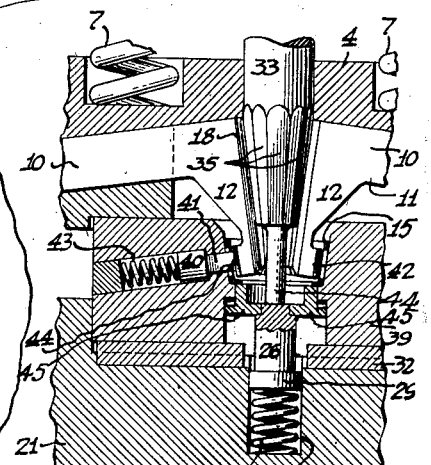
Fig. 7 is a sectional detail showing the punches in retracted position with adjacent parts in section and the positioning member engaged within an opening in the work.

It is desirable that the inner sharp corners of the bridges or portions of the cage wall between the openings 14, be removed or beveled as indicated at 38 in Fig. 6, whereby rollers when placed in the finished cage opposite these openings, will bear against such beveled edges and will project farther through these openings, and to so form these edges 38, each cage after being punched, is placed in another machine of substantially the same construction as the one described, with the exception that each punch foot 42 is beveled at each side as shown in Fig. 6 to compress or flatten these edges of the openings in the cage wall when these punches are forced radially outward by the spreader 33 into said openings. Further, as shown in Figs. 6 and 7, the die block 39 which corresponds to the die block 20, is formed without the radial passage 24 and 31 for the escape of punchings and a latch member 40 is placed within a radial bore in said block and formed with an end portion 41 which is rectangular in cross section to fit within one of the openings 14 in the cage and accurately locate said cage in the die with these openings properly positioned relative to the punch feet 42. This latch member is projected toward the cage by a coiled spring 43 and the lower side of the end portion 41 of said latch member is beveled as at 44 so that when said cage is moved upwardly out of the die, said beveled end will be engaged by the lower end of the opening 14 engaged thereby, as the cage 15 is moved upwardly in removing it from the block 39, and said latch will be forced back against the action of the spring 43 and allow the cage to be removed. Also, as shown in Fig. 7, the lower end portion 44 of the spreader 33 is reduced in diameter and extended so that it will engage and move the cup 45 which is of slightly different construction from the cup 25, before the spreader operates to move the punches outwardly into the openings 14 of the cage, thus permitting said cage to drop to its seat in the die block before the punches are moved outwardly and thus insure the aligning of the openings 14 with the forming ends of the punches.

As shown in Fig. 1, the parts are in the position at the end of the punching operation, and upon upward movement of the head 1 from this position, the spreader 33 will first be partially lifted from between the inner ends of the punches, the carrier block 4 being held down upon the die block 20 by the expansion of the springs 7. As the guide ring 3 is secured to the head, it also moves upwardly with the head and in doing so, engages the ends 19 of the arms 10 of the several punches 11, moving said punches inwardly and disengaging the feet 13 of these punches from the openings 14 just made by them in the cage. These punches are thus freed from the work so that upon further upward movement of the head and guide ring, the annular flange 6 on said carrier block will come into contact with an annular shoulder on the ring, and upon further upward movement of the head and ring, will lift the carrier block away from its seat on the upper end of the die block 20 and withdraw the punches from the interior of the cage which has just been formed. Upon the lifting of the carrier block and consequent withdrawal of the punches from the cage, said cage will at once be ejected from or raised in the die block by the action of the spring 28 which will move the cup 25 upwardly in its guide opening in the die block into engagement with the lower end of the cage and lift said cage, freeing the same from the die so that it may be readily taken out and a blank 16 set in its place.

When the blank 16 for the next cage to be formed, is in place, a downward movement of the head 1 moves the spreader 33 in the space between the inner ends of the punches 11, compressing the springs 7 somewhat, and further movement of the head forces, through the power applied by these springs, the carrier block downwardly until it seats upon the upper end of the die block 20. Upon such seating, further downward movement of the head moves the carrier block toward the head, the same being positively and accurately guided in such movement by the guide ring 3, further compressing the springs and permitting the head to continue its down movement to engage the spreader 33 with the inner ends of the several punches to force them radially outward. This final downward movement of the spreader 33, brings the lower end thereof into contact with the bottom of the ejector cup 25, moving the same downward in its guide opening in the die block and compressing the spring 28 so that, upon the next upward movement of the spreader, said spring will operate to lift the finished cage as previously described.

With this arrangement, the parts are held in perfect alignment, the carrier block 4 being accurately guided by the guide ring 3 on the head, the head being accurately guided in its movements toward and from the base 21 by the guide posts 36, and thus the punches 11 are accurately located relative to the work in the die block 20 and the spreader 33 relative to the several punches.

Rotation of guide ring 3 and header relative to the carrier block is prevented by the guide splines 5 which permit free longitudinal movement of said carrier block in said ring and thus the several punches 11 are always in position to be engaged by the facets 35 on the spreader, and relative rotation between head 1 and die block 20 is prevented by the guide posts 36, so that the punches 11 will be properly and accurately located relative to the openings 24 in the block. It is the final downward movement of the spreader 33 which forces the punches outwardly, perforating the blank and in so doing the force is directly applied to the punching end portions of the punches with a sliding movement of the spreader thereagainst, thus relieving the punches of strains tending to break the same and from excessive wear. The whole construction lends itself to accuracy and freedom from excessive wear, and the springs 7 are housed and protected by the arrangement.

Obviously changes may be made in the construction and arrangement within the scope of the appended claims, and such changes are contemplated.

Having thus fully described my invention, what I claim is:—

1. In a device of the character described, the combination of a base, a die block on said base, a series of non-pivotal punches, means for supporting and guiding said punches for bodily rectilinear movement, and means for engaging all of said punches and moving the same bodily into engagement with work held in the die block and punch a plurality of openings in the work, said punch-supporting means being movable vertically into and out of the plane wherein the punches are rendered active.

2. In a device of the character described, the combination of a base, a die block on said base, a carrier member having guide ways, a series of non-pivotal punches slidable rectilinearly and bodily in said guide ways, and means for engaging all of said punches and moving the same in said guide ways toward work held in said die block, said carrier member being movable vertically into and out of the plane wherein the punches are rendered active.

3. In a device of the character described, the combination of a base, a die block on said base, a carrier block having a series of radial guide ways, a series of radially extending non-pivotal punches in said guide ways movable rectilinearly and bodily therein, and means for engaging and moving said punches in said guide ways radially of work held in said die block, said carrier block being movable into and out of the plane wherein the punches are rendered active.

4. In a device of the character described, the combination of a die block, a carrier member having a series of radial guide ways, a series of non-pivotal punches slidable rectilinearly and bodily and radially in said guide ways, and means for sliding said punches in said guide ways radially outward into engagement with work held in said die block, said carrier member being movable vertically into and out of the plane wherein the punches are rendered active.

5. In a device of the character described, the combination of a die block having a recess therein to receive a hollow member having a circular wall to be formed with a series of openings, a carrier member formed with a series of radial guide ways, a series of non-pivotal punches having portions to engage and slide within said guide ways rectilinearly toward and from said hollow member and also having hole forming portions to project into said hollow member through the open end thereof, and means for moving said punches along said guide ways to bring said hole forming portions into engagement with the wall of said hollow member, radially outward thereof, said carrier member being movable vertically into and out of the plane wherein the punches are rendered active.

6. In a device of the character described, the combination of a die block having a recess therein to receive a hollow member having a circular wall to be formed with a series of openings, a carrier block formed with a series of radial guide ways and a central opening into which said guide ways open at their inner ends, a series of non-pivotal punches each having an arm to slide rectilinearly in said guide ways and a downwardly extending leg to project into said hollow member through an open end thereof, each of said legs having a foot projecting laterally from the lower end of said leg to engage said wall of said hollow member and form an opening therein upon outward radial movement of said punches, means for moving all of said punches radially outward, and means for moving said die block and carrier block relatively to enter said punch legs into the hollow member held by said die block, said carrier block being movable vertically into and out of the plane wherein the punches are rendered active.

7. In a device of the character described, the combination of a die block having a recess to receive a hollow member having a circular conical wall to be formed with a series of openings; a carrier block formed with a series of radial guide ways extending outwardly and downwardly at right angles to the plane of said conical wall of the member, a series of non-pivotal punches having radially extending arms adapted to move rectilinearly in said guide ways and legs integral with the inner ends of said arms and extending at right angles thereto, said legs having inner side contact surfaces inclined upwardly and outwardly to correspond with the inclination of the conical wall of the hollow member and also formed at their lower ends with laterally and outwardly extending feet to engage and punch openings in said wall of the hollow member, means for moving said carrier member vertically to enter said legs and feet within the hollow member held in said die block, and a spreader to engage the contact surfaces of said punches and move said punches radially outward.

8. In a device of the character described, the combination of a base member, a die block on said base member having a recess to receive and hold a hollow open ended member to be formed with openings in the circular wall thereof, a head, means for guiding said head in moving toward and from said base, a carrier block formed with a central opening and radial guide ways opening into said central opening, means for permitting movement of said carrier block toward and from said head and guiding the same in such movement, a plurality of non-pivotal punches each having an arm slidable longitudinally and rectilinearly in said guide ways and a downwardly extending leg in said central opening of said carrier block, each leg having a foot at its lower end to engage and perforate the wall of said hollow member in said die block, and a center spreader projected by said head downwardly between the inner ends of said punches to spread the same.

9. In a device of the character described, the combination of a base member, a die block on said base member having a recess to receive and hold a hollow open ended member to be formed with openings in the circular wall thereof, a head, means for guiding said head in its movement toward and from said base, a carrier block formed with a central opening and guide ways extending radially therefrom, a guide ring on said head within which said carrier block is guided in its movement relative to said head, means for limiting the relative movement between said head and carrier block within said ring, a series of non-pivotal punches slidable radially and rectilinearly in said guide ways in said carrier block and having legs extending downwardly within and through said central opening in said carrier block, said legs having feet at their lower ends to engage and form openings in the wall of said hollow member, springs interposed between said head and carrier block to move the same relatively in one direction, and a spreader operated by the downward movement of said head to engage between the inner ends of said punches and move the same radially outward in their guide ways, said punches being moved in an opposite direction by the movement of said carrier block in its guide ring.

10. In a device of the character described, the combination of a base member, a die block on said base member and formed with a central recess forming a die to receive an open ended blank to be formed with a series of openings in its wall, said die block being also formed with radial passages for the escape of metal severed from said wall of said blank in forming said openings therein, a head downwardly movable toward and from said base, a guide ring on the lower side of said head, a carrier block movable downwardly in said ring and guided thereby, said carrier block being provided with an axial opening therethrough and a plurality of radial guide ways opening at their inner ends into said central opening and at their outer ends through the peripheral wall of said block, a plurality of non-pivotal punches having arms movable longitudinally and rectilinearly in said guide ways in said carrier block and engaged at their outer ends by said ring and moved radially inward thereby and having legs at their inner ends within said axial opening in said carrier block and projecting below the lower side of said block and formed with outwardly extending punch feet at their lower ends, and a spreader operated by downward movement of said head and having a lower end portion formed with facets to engage the inner end faces of said punches.

In testimony whereof I affix my signature.
SILAS A. STRICKLAND.